(12) United States Patent
Li et al.

(10) Patent No.: US 11,938,567 B1
(45) Date of Patent: Mar. 26, 2024

(54) LASER FUSION WELDING DEVICE

(71) Applicant: XINJIANG TECHNICAL INSTITUTE OF PHYSICS AND CHEMISTRY, CHINESE ACADEMY OF SCIENCE, Urumqi (CN)

(72) Inventors: Linjun Li, Urumqi (CN); Shilie Pan, Urumqi (CN); Xiaoming Duan, Urumqi (CN); Yu Zhou, Urumqi (CN); Yingjie Shen, Urumqi (CN); Qianqian Hao, Urumqi (CN); Yuqiang Yang, Urumqi (CN); Xin He, Urumqi (CN)

(73) Assignee: XINJIANG TECHNICAL INSTITUTE OF PHYSICS AND CHEMISTRY, CHINESE ACADEMY OF SCIENCES, Urumqi (CN)

( * ) Notice: Subject to any disclaimer, the term of this patent is extended or adjusted under 35 U.S.C. 154(b) by 0 days.

(21) Appl. No.: 18/220,297

(22) Filed: Jul. 11, 2023

(30) Foreign Application Priority Data

Nov. 9, 2022 (CN) .......................... 202211399811.4

(51) Int. Cl.
  *B23K 26/21* (2014.01)
  *B23K 26/046* (2014.01)
  (Continued)

(52) U.S. Cl.
  CPC ............ *B23K 26/21* (2015.10); *B23K 26/046* (2013.01); *B23K 26/0643* (2013.01);
  (Continued)

(58) Field of Classification Search
  CPC .. B23K 26/21; B23K 26/046; B23K 26/0643; B23K 26/0648; B23K 26/0652; B23K 26/073
  See application file for complete search history.

(56) References Cited

U.S. PATENT DOCUMENTS 5,455,838 A   10/1995   Heritier et al.
5,832,016 A   11/1998   Basu
(Continued)

FOREIGN PATENT DOCUMENTS

CN   107735206 A   2/2018
CN   214044329 U   8/2021
(Continued)

*Primary Examiner* — Dana Ross
*Assistant Examiner* — Kuangyue Chen
(74) *Attorney, Agent, or Firm* — Bayramoglu Law Offices LLC

(57) ABSTRACT

A laser fusion welding device includes a 1.9 μm laser light source, a control unit and a light spot adjusting device. The control unit is configured to control the laser light source and the light spot adjusting device to adjust a laser power density at an object to be subjected to fusion welding. The 1.9 μm laser light source has output power of 100-500 W. The control unit includes a time control unit, a power control unit and a light spot control unit. The time control unit is configured to control a turn-on time of the laser light source. The power control unit is configured to control the output power of the laser light source. The light spot control unit is configured to control the light spot adjusting device to adjust a size of a light spot at the object to be subjected to fusion welding.

9 Claims, 3 Drawing Sheets

(51) Int. Cl.
B23K 26/06      (2014.01)
B23K 26/073     (2006.01)
B23K 26/70      (2014.01)

(52) U.S. Cl.
CPC ...... B23K 26/0648 (2013.01); B23K 26/0652 (2013.01); B23K 26/073 (2013.01)

(56) References Cited

U.S. PATENT DOCUMENTS

2012/0165801 A1* 6/2012 Bragagna .............. H01S 3/0941
                                                     606/18
2016/0368099 A1* 12/2016 Grapov .............. B23K 26/1476

FOREIGN PATENT DOCUMENTS

| EP | 0999620 A2 | 5/2000 |
| JP | 2006203117 A | 8/2006 |

* cited by examiner

LASER FUSION WELDING DEVICE

CROSS REFERENCE TO THE RELATED APPLICATIONS

This application is based upon and claims priority to Chinese Patent Application No. 202211399811.4, filed on Nov. 9, 2022, the entire contents of which are incorporated herein by reference.

TECHNICAL FIELD

The present disclosure relates to the technical field of laser welding, and in particular, to a fusion welding device based on a 1.9 μm laser.

BACKGROUND

Laser welding or cutting provides an important function in the field of laser application, especially high-power laser welding or cutting, which has attracted more and more attention in promotion and application.

However, in existing laser welding or cutting technology, not only are there technical obstacles in obtaining a high-power light source, but there are also bottlenecks in controlling the light spot power density during laser welding or cutting. This leads to certain limitations in the application of laser welding or cutting.

SUMMARY

An objective of the present disclosure is to provide a fusion welding device based on a 1.9 μm laser, to solve the technical problems existing in current laser welding or cutting.

Specifically, the present disclosure provides a fusion welding device based on a 1.9 μm laser, including a 1.9 μm laser light source, a control unit and a light spot adjusting device, where the control unit is configured to control the laser light source and the light spot adjusting device to adjust a laser power density at an object to be subjected to fusion welding;

the 1.9 μm laser light source has output power of 100-500 W;

the control unit includes a time control unit, a power control unit and a light spot control unit, where the time control unit is configured to control a turn-on time of the laser light source, the power control unit is configured to control the output power of the laser light source, and the light spot control unit is configured to control the light spot adjusting device to adjust a size of a light spot at the object to be subjected to fusion welding; and the light spot adjusting device includes a lens barrel, an electric slideway axially arranged along an inner side wall of the lens barrel, and a plurality of optical lenses arranged in the lens barrel, and the light spot control unit is configured to control a distance between the plurality of optical lenses through the electric slideway to adjust the size of the light spot at the object to be subjected to fusion welding.

In some embodiments, the plurality of optical lenses include a first lens, a second lens and a third lens, where the first lens is configured as a collimating lens and arranged at a light incident end of the lens barrel; and the second lens and the third lens slide along the electric slideway to change the size of the light spot at the object to be subjected to fusion welding. In some embodiments, the laser light source includes a resonant cavity and n discontinuous laser crystals located in the resonant cavity, where the resonant cavity includes a total reflection mirror and an output mirror, the total reflection mirror is coated with a 1.9 μm high-reflection film layer, the output mirror is coated with a film layer having a transmittance of 10% for 1.9 μm, the n discontinuous laser crystals are all Tm:yttrium aluminum perovskite (YAP), and the n discontinuous laser crystals are in a side pumping mode;

where a side face of each of the laser crystals is provided with a semiconductor pumping light source surrounding the laser crystal, side faces of the n discontinuous laser crystals are provided with n semiconductor pumping light sources, each of the semiconductor pumping light sources surrounds the laser crystal at an angle less than 360°, a sum of angles of the n semiconductor pumping light sources surrounding the n discontinuous laser crystals is 360°, and n is a natural number greater than or equal to 4.

In some embodiments, projections of trajectories of any two of the n semiconductor pumping light sources surrounding laser crystals on a projection plane formed by end faces of the laser crystals along a direction perpendicular to an optical path do not overlap.

In some embodiments, projections of trajectories of the n semiconductor pumping light sources surrounding the laser crystals on the projection plane formed by end faces of the laser crystals along the direction perpendicular to the optical path form a complete circle.

In some embodiments, the trajectories of the n semiconductor pumping light sources surrounding the n laser crystals are sequentially projected on the projection plane formed by the end faces of the laser crystals along the direction perpendicular to the optical path, and the projections of the trajectories are connected end to end to form the complete circle.

In some embodiments, along a direction of the optical path, the n semiconductor pumping light sources have the same length as the corresponding n laser crystals along the direction of the optical path.

In some embodiments, the n discontinuous laser crystals have the same cross-section.

In some embodiments, the n discontinuous laser crystals have the same or different lengths.

In some embodiments, each of the n discontinuous laser crystals has a cross-section of 3 mm*3 mm; each of the n discontinuous laser crystals has a length of 10-20 mm; and each of the n discontinuous laser crystals is a Tm-doped laser crystal with a doping concentration directly proportional to the length of the laser crystal.

The present disclosure has the beneficial effects that by controlling the 1.9 μm high-power laser light source and the light spot adjusting device, the size of the light spot and a focal depth at the object to be subjected to fusion welding are changed, so that high-precision cutting or welding can be realized.

BRIEF DESCRIPTION OF THE DRAWINGS

In order to describe the technical solutions in the embodiments of the present disclosure more clearly, the accompanying drawings required for describing the embodiments are briefly described below. Obviously, the accompanying drawings in the following description show merely some embodiments of the present disclosure, and those of ordinary skill in the art can further derive other accompanying drawings from these accompanying drawings without creative efforts.

DETAILED DESCRIPTION OF THE EMBODIMENTS

To make the objectives, technical solutions, and advantages of the present disclosure clearer, the following further describes the present disclosure in detail with reference to the accompanying drawings. Apparently, the described embodiments are merely some of rather than all of the embodiments of the present disclosure. All other embodiments obtained by those of ordinary skill in the art based on the embodiments of the present disclosure without creative efforts should fall within the protection scope of the present disclosure.

Preferred embodiments of the present disclosure are described in detail below with reference to the accompanying drawings.

Figure 1:
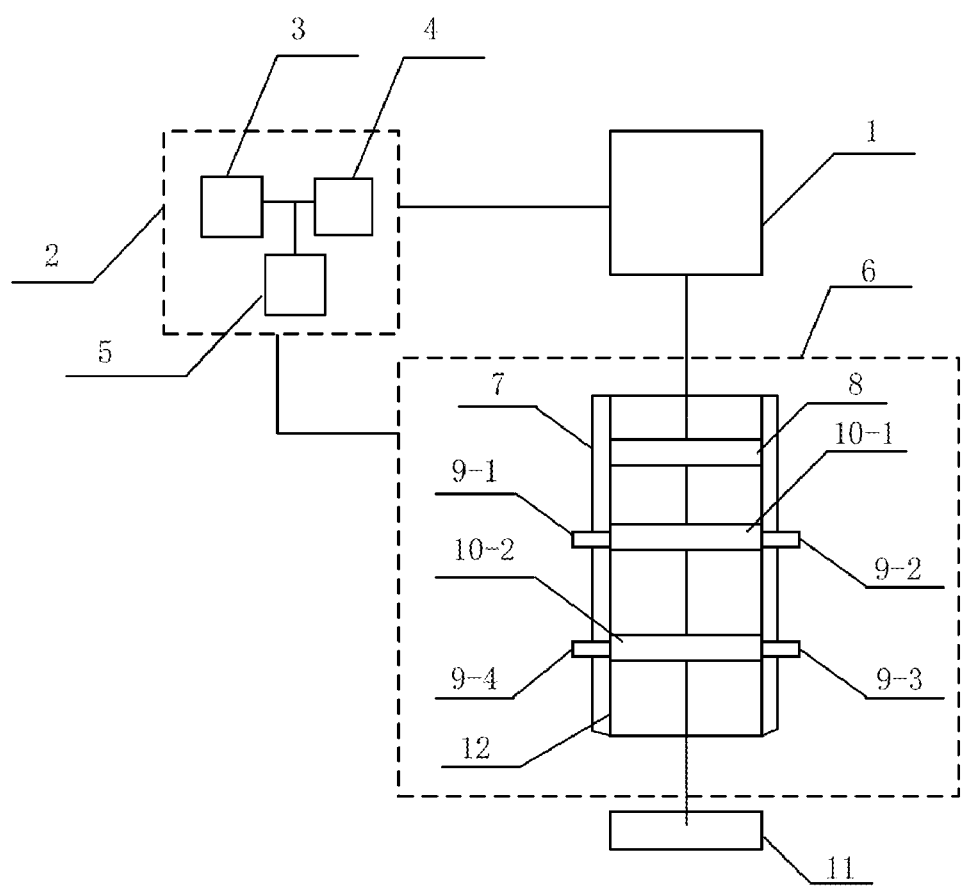
FIG. 1 is a schematic structural diagram of a fusion welding device based on a 1.9 μm laser according to an embodiment of the present disclosure.

As shown in FIG. 1, the present disclosure provides a fusion welding device based on a 1.9 μm laser, to weld or cut a special plastic material. The fusion welding device includes 1.9 μm laser light source 1, control unit 2, and light spot adjusting device 6, where the control unit 2 controls the laser light source 1 and the light spot adjusting device 6 to adjust a laser power density at an object to be subjected to fusion welding; the 1.9 μm laser light source 1 has output power of 100-500 W, and by providing the high-power laser light source, sufficient energy is provided for laser cutting; the control unit 2 includes time control unit 3, power control unit 4 and light spot control unit 5, where the time control unit 3 is configured to control a turn-on time of the laser light source 1, so as to control a laser output time; the power control unit 4 is configured to control the output power of the laser light source 1, and the light spot control unit 5 controls the light spot adjusting device 6 to adjust a size of a light spot at the object to be subjected to fusion welding. The light spot adjusting device 6 includes lens barrel 7, an electric slideway 12 (net-shewn)-axially arranged along an inner side wall of the lens barrel, and a plurality of optical lenses arranged in the lens barrel 7, and the light spot control unit 5 controls a distance between the plurality of optical lenses through the electric slideway to adjust the size of the light spot at the object 11 to be subjected to fusion welding.

According to the present invention, by controlling the 1.9 μm high-power laser light source and the light spot adjusting device, the size of the light spot and a focal depth at the object to be subjected to fusion welding are changed, so that high-precision cutting or welding can be realized.

The 1.9 μm laser light source must be a high-power laser light source configured to provide cutting or welding power.

The plurality of optical lenses include first lens 8, second lens 10-1, and third lens 10-2, where the first lens 8 is configured as a collimating lens and arranged at a light incident end of the lens barrel 7; and the second lens 10-1 and the third lens 10-2 slide along the electric slideway to change the size of the light spot at the object 11 to be subjected to fusion welding.

The operation time and output power of the laser light source 1 are controlled by the modulation of the time control unit 3 and the power control unit 4, and the size of the light spot of the object 11 to be subjected to fusion welding is changed by adjusting the light spot adjusting device 6 by the light spot control unit 5, so as to change the power density at the object to be subjected to fusion welding, to adapt to the material (such as a fusion point, hardness, and brittleness) of the object to be subjected to fusion welding for cutting and/or fusion welding. The light spot adjusting device 6 includes a metal cylinder with two electric slideways (with a distance therebetween being the diameter of the cylinder) and three convex lenses. The first lens 8 is configured as the collimating lens and fixed in the metal cylinder, and the second lens 10-1 and the third lens 10-2 can change positions along the electric slideways to change the size of the light spot and the focal depth at the object to be subjected to fusion welding. Control valve 9-1 and control valve 9-2 move with the second lens 10-1 under the control of the light spot control unit 5, and fix the second lens 10-1 to an appropriate position; and control valve 9-3 and control valve 9-4 move with the third lens 10-2 under the control of the light spot control unit 5, and fix the third lens 10-2 to an appropriate position. By adjusting a distance between the second lens 10-1 and the third lens 10-2, the size of the light spot outputted to the object to be subjected to fusion welding can be adjusted. With reference to the output power of the laser light source 1, the output power density at the object to be subjected to fusion welding can be finally adjusted to adapt to the characteristics of the object to be subjected to fusion welding, such as a fusion point, hardness, and brittleness. The object to be subjected to fusion welding is usually an organic plastic material, which has strong absorption performance for the 1.9 μm laser, so that burr can be avoided on a cutting surface, and the fusion welding process can also realize the smooth connection of a fusion welding junction.

According to requirement for the 1.9 μm laser light source, the laser light source must be a high-power laser light source with a wavelength of 1.9 μm. The 1.9 μm output of a Tm-doped solid-state laser is implemented by performing end pumping on Tm-doped crystals by using a laser diode with a wavelength of 790 nm. The 1.9 μm implementation requires shaping and focusing of pumping light during the debugging of the laser light source. In addition, the optical path of the pumping light further needs to coincide with oscillating light to achieve high output efficiency. In addition, 790 nm band pertains to out-of-band pumping as a pump source, may produce a high thermal effect, and has low laser conversion efficiency. Therefore, to achieve high-power 1.9 μm laser output, heat dissipation efficiency needs to be improved, and it is very difficult to achieve high-power output on the basis that existing heat dissipation efficiency cannot be improved.

The side pumping has the advantages that a gain region in the laser crystal is large and uniform, so that no local high temperature occurs internally, and the side pumping can be used as a pumping structure of a high-power laser. Moreover, the side pumping structure is relatively simple, and there is no need to perform operations such as shaping the pumping light and adjusting the pumping light to be coaxial with oscillating light, which greatly simplifies a debugging process of a resonant cavity and has great advantages in improving the stability of an entire laser light source system. In addition, in-band pumping technique is generally used to achieve high-efficiency pumping, so as to improve laser conversion efficiency and reduce the thermal effect. In contrast, an absorption spectrum of Tm ions in a 1.7 μm band has a width much greater than that in a 790 nm band. In addition, in order to realize high-power laser output, a plurality of laser working media may be inserted into the laser resonant cavity. Therefore, using the side pumping technique and the 1.7 μm in-band pumping technique for the Tm-doped ion laser light source and using the plurality of laser working media in the cavity can achieve high-power, high-efficiency, stable and debuggable 1.9 μm laser output with convenience in operation and a simple structure.

Figure 2:
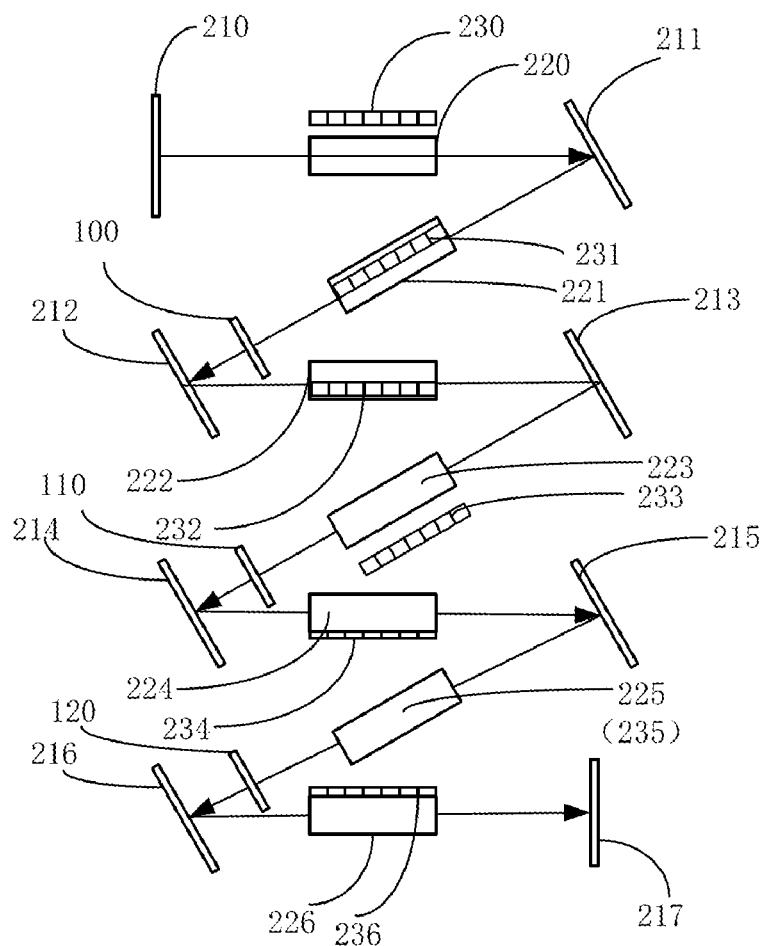
FIG. 2 is a schematic structural diagram of a 1.9 μm laser light source according to an embodiment of the present disclosure.
Figure 3:
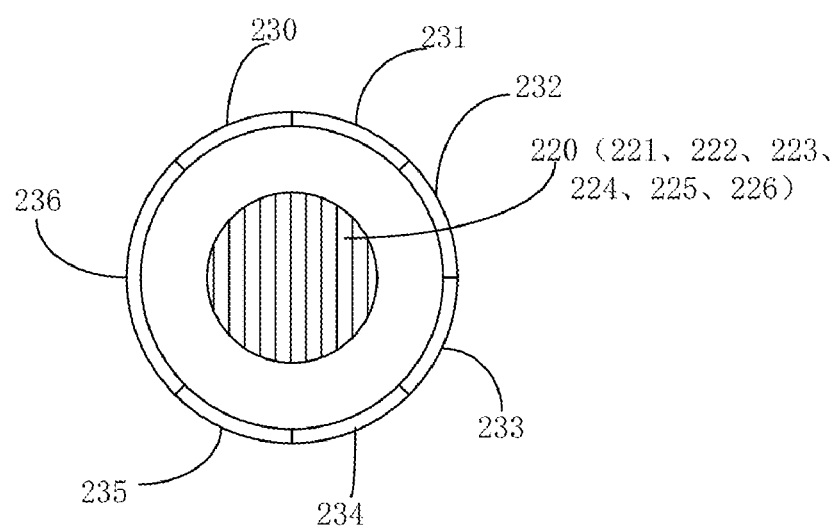
FIG. 3 is a schematic projection diagram of a plurality of crystals and side pumping light sources according to an embodiment of the present disclosure.

Specifically, in some embodiments, as shown in FIGS. 2 and 3, the laser light source 1 includes a resonant cavity and n discontinuous laser crystals located in the resonant cavity, where the resonant cavity is a folded cavity. With regard to the n discontinuous laser crystals, n is, for example, 7, n is a natural number greater than or equal to 4, and the value of n depends on a requirement of output power and performance of pumping power. The laser crystals include first laser crystal 220, second laser crystal 221, third laser crystal 222, fourth laser crystal 223, fifth laser crystal 224, sixth laser crystal 225, and seventh laser crystal 226. The resonant cavity includes a plurality of total reflection mirrors and output mirror 217. The plurality of total reflection mirrors include, for example, first total reflection mirror 210, second total reflection mirror 211, third total reflection mirror 212, fourth total reflection mirror 213, fifth total reflection mirror 214, sixth total reflection mirror 215, and seventh total reflection mirror 216, where the second total reflection mirror 211, the third total reflection mirror 212, the fourth total reflection mirror 213, the fifth total reflection mirror 214, the sixth total reflection mirror 215 and the seventh total reflection mirror 216 each are a mirror performing total reflection at a small angle, for example, within 10°, so that the folded cavity is more compact after multiple folds. A laser crystal and a corresponding semiconductor side pumping light source are arranged between every two total reflection mirrors, the total reflection mirrors are coated with a 1.9 μm high-reflection film layer, the output mirror 217 is coated with a film layer having a transmittance of 10% for 1.9 μm, the n discontinuous laser crystals are all Tm:YAP, and the n discontinuous laser crystals are in a side pumping mode. Pumping light of each pumping light source passes through the corresponding laser light crystal for pumping. The side pumping light source is a 1.7 μm semiconductor laser diode array pumping source, and a plurality of mode matching mirrors, such as first mode matching mirror 100, second mode matching mirror 110 and third mode matching mirror 120, are arranged in the resonant cavity. Each of the mode matching mirrors is configured to ensure that modes of light outputted by the crystals are the same, thus ensuring the overall output quality and output power of the laser.

As shown in FIG. 2, a side face of each of the laser crystals is provided with a semiconductor pumping light source surrounding the laser crystal, and side faces of the n discontinuous laser crystals are provided with n semiconductor pumping light sources. For example, the first laser crystal 220 is provided with first semiconductor pumping light source 230, the second laser crystal 221 is provided with second semiconductor pumping light source 231, the third laser crystal 222 is provided with third semiconductor pumping light source 232, the fourth laser crystal 223 is provided with fourth semiconductor pumping light source 233, the fifth laser crystal 224 is provided with fifth semiconductor pumping light source 234, and the sixth laser crystal 225 is provided with sixth semiconductor pumping light source 235, and the seventh laser crystal 226 is provided with seventh semiconductor pumping light source 236. Each of the semiconductor pumping light sources surrounds a part of a laser crystal corresponding thereto, that is, each of the semiconductor pumping light sources surrounds the laser crystal at an angle less than 360°. For example, the semiconductor pumping light source surrounds the laser crystal at an angle of 90°. A sum of angles of the n semiconductor pumping light sources surrounding the n discontinuous laser crystals is 360°, and n is a natural number greater than or equal to 4.

In some embodiments, as shown in FIG. 3, FIG. 3 is a schematic diagram that shows a positional relationship between a laser crystal provided on a side of an end face of each laser crystal and a corresponding semiconductor pumping light source, after n pairs of laser crystals and corresponding semiconductor pumping light sources are spliced together. It can be seen that projections of trajectories of any two of the n semiconductor pumping light sources surrounding the laser crystals on a projection plane formed by end faces of the laser crystals do not overlap. When the semiconductor pumping light sources overlap, the laser crystals at an overlapping part may receive pumping laser light, resulting in a thermal effect that causes a number of particles at the crystals overlapping along the direction of the optical path to reverse. The resulting thermal effect affects performance of oscillating laser light at the overlapping part, thereby affecting the overall laser output quality and power of the laser light source.

In some embodiments, projections of trajectories of the n semiconductor pumping light sources surrounding the laser crystals in the direction of end faces of the laser crystals form a complete circle. As shown in FIG. 3, after n pairs of laser crystals and corresponding semiconductor pumping light sources are spliced together along the direction of the optical path, the trajectories of the n semiconductor pumping light sources surrounding the n laser crystals are sequentially projected on a projection plane formed by the end faces of the laser crystals, and the projections of the trajectories are connected end to end to form the complete circle, so as to make maximum use of the performance of each crystal to generate laser oscillation and improve the pumping efficiency of the laser crystals. The n semiconductor pumping light sources may have the same or different covering angles. When the corresponding laser crystals have the same length, the covering angles of the n semiconductor pumping light sources may be set to be the same. For example, six laser crystals are provided with six pumping light sources, and the pumping light sources cover a 600 range of the corresponding laser crystals in sequence along the direction of the optical path. Due to the same parameters of the laser crystals, including length, cross-section, doping concentration, etc., the thermal lens effect in the laser crystals is the same by using the pumping light sources with the same coverage and the same pumping power for pumping. By simulating a corresponding relationship between the pumping light of one of the laser crystals and a thermal lens effect in advance, the laser crystals can be pumped in the same pumping mode, which reduces procedures of laser debugging, can ensure that the laser crystals have laser outputs of the same parameters, improves stability of the final laser output, and also ensures optical quality and power of the output laser light.

In some embodiments, the n semiconductor pumping light sources may have different covering angles. When the corresponding laser crystals have different lengths or doping concentrations, the covering angles of the n semiconductor pumping light sources may be set to be different or identical. Generally, a covering angle is directly proportional to a doping concentration and/or a length of a laser crystal. For example, six laser crystals are provided with six pumping light sources, and the pumping light sources cover the corresponding laser crystals in sequence by 120°, 90°, 60°, 30° and 60° along the direction of the optical path. By matching a corresponding coverage angle based on the length and/or doping concentration of each laser crystal, the pumping efficiency of the laser crystal can be maximized within the thermal lens effect range, enabling each pair of laser crystal and pumping light source to achieve the best matching state, thereby achieving maximum-power laser output.

In some embodiments, along a direction of the optical path, the n semiconductor pumping light sources have the same length as the corresponding n laser crystals along the direction of the optical path. By matching an equal-length pumping light source based on a length of each laser crystal, the pumping efficiency of the laser crystal can be maximized within the thermal lens effect range, enabling each pair of laser crystal and pumping light source to achieve the best matching state, thereby achieving maximum-power laser output.

In some embodiments, the n discontinuous laser crystals have the same cross-section, thus ensuring that oscillating light generated by the laser crystals is coaxial, and further ensuring the narrow pulse width characteristics of final output laser light.

In some embodiments, the n discontinuous laser crystals have the same or different lengths. In some embodiments, each of the n discontinuous laser crystals has a cross-section of 3 mm*3 mm; and each of the n discontinuous laser crystals has a length of 10-20 mm.

In some embodiments, each of the n discontinuous laser crystals is a Tm-doped laser crystal with a doping concentration directly proportional to the length of the laser crystal.

In some embodiments, by configuring a corresponding number of laser crystals, the average power of the final output of the laser light source can reach 100-500 W. Such high-power output is very difficult in a single crystal structure.

In this embodiment, the high-power 1.9 μm laser output can be achieved by side pumping of a plurality of discontinuous laser crystals, and the thermal effect problem of the laser crystals under high power is solved by a plurality of surrounding semiconductor side pumping light sources, thereby achieving high-power laser output.

Figure 4:
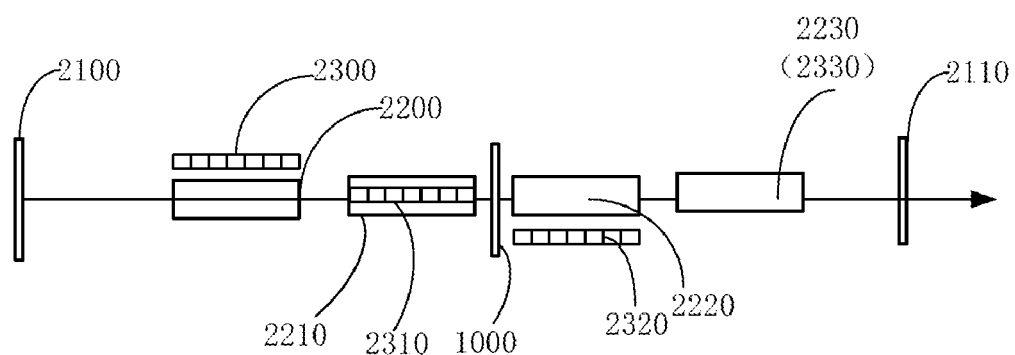
FIG. 4 is a schematic structural diagram of a 1.9 μm laser light source according to another embodiment of the present disclosure.
Figure 5:
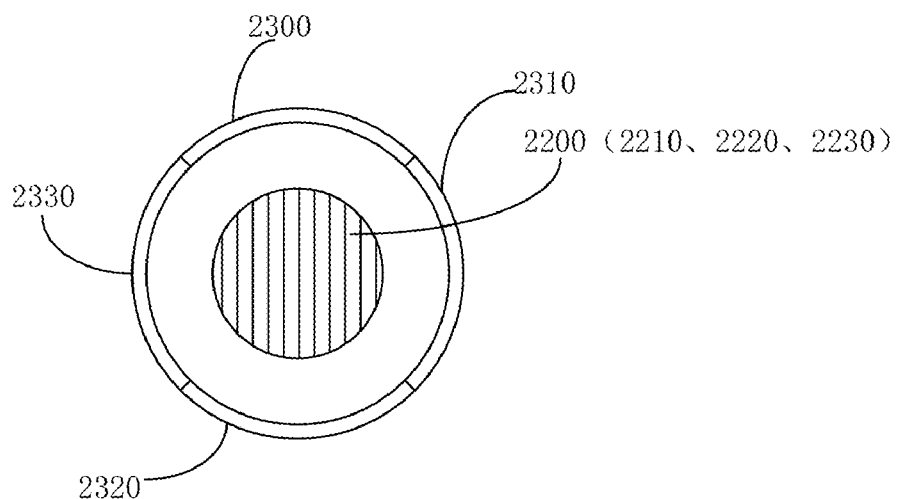
FIG. 5 is a schematic projection diagram of a plurality of crystals and side pumping light sources according to another embodiment of the present disclosure.

In some other embodiments, as shown in FIGS. 4 and 5, the laser light source includes a resonant cavity and n discontinuous laser crystals located in the resonant cavity, where n is a natural number greater than or equal to 4, and the value of n depends on a requirement of output power and performance of pumping power. For example, n is 4, and the resonant cavity is described by using a straight cavity. The laser crystals include laser crystal I 2200, second laser crystal II 2210, third laser crystal III 2220, and fourth laser crystal IV 2230. The resonant cavity includes total reflection mirror 2100 and output mirror 2110. The four laser crystals and the corresponding semiconductor side pumping light sources are arranged in the resonant cavity. The total reflection mirror 2100 is coated with a 1.9 μm high-reflection film layer, the output mirror 2110 is coated with a film layer having a transmittance of 10% for 1.9 μm, the four discontinuous laser crystals are all Tm:YAP, and the four discontinuous laser crystals are in a side pumping mode. Pumping light of each pumping light source passes through the corresponding laser light crystal for pumping. The side pumping light source is a 1.7 μm semiconductor laser diode array pumping source, and at least one mode matching mirror 1000 is arranged in the resonant cavity, and is configured to ensure that modes of light outputted by the crystals are the same, thus ensuring the overall output quality and power of the laser.

As shown in FIG. 4, a side face of each of the laser crystals is provided with a semiconductor pumping light source surrounding the laser crystal, and side faces of the n discontinuous laser crystals are provided with n semiconductor pumping light sources. For example, the first laser crystal I 2200 is provided with semiconductor pumping light source I 2300, the laser crystal II 2210 is provided with semiconductor pumping light source II 2310, the laser crystal III 2220 is provided with semiconductor pumping light source III 2320, and the laser crystal IV 2230 is provided with semiconductor pumping light source IV 2330 (blocked). Each of the semiconductor pumping light sources surrounds a part of the laser crystal, that is, each of the semiconductor pumping light sources surrounds the laser crystal at an angle less than 360°. For example, the semiconductor pumping light source surrounds the laser crystal at an angle of 90°. A sum of angles of the four semiconductor pumping light sources surrounding the four discontinuous laser crystals is 360°.

In some embodiments, as shown in FIG. 5, FIG. 5 is a schematic diagram that shows a positional relationship between a laser crystal provided on a side of an end face of each laser crystal and a corresponding semiconductor pumping light source, after four pairs of laser crystals and corresponding semiconductor pumping light sources are spliced together. It can be seen that projections of trajectories of any two of the four semiconductor pumping light sources surrounding the laser crystals on the projection plane formed by end faces of the laser crystals do not overlap. When the semiconductor pumping light sources overlap, the laser crystals at an overlapping part may receive pumping laser light, resulting in a thermal effect that causes a number of particles at the crystals overlapping along the direction of the optical path to reverse. The resulting thermal effect affects performance of oscillating laser light at the overlapping part, thereby affecting the overall laser output quality and power of the laser light source.

In some embodiments, projections of trajectories of the four semiconductor pumping light sources surrounding the laser crystals in the direction of end faces of the laser crystals form a complete circle. As shown in FIG. 5, after four pairs of laser crystals and corresponding semiconductor pumping light sources are spliced together along the direction of the optical path, the trajectories of the four semiconductor pumping light sources surrounding the four laser crystals are sequentially projected on a projection plane formed by the end faces of the laser crystals, and the projections of the trajectories are connected end to end to form the complete circle. The four semiconductor pumping light sources may have the same or different covering angles. When the corresponding laser crystals have the same length, the covering angles of the four semiconductor pumping light sources may be set to be the same. For example, four laser crystals are provided with four pumping light sources, and the pumping light sources cover a 90° range of the corresponding laser crystals in sequence along the direction of the optical path. Due to the same parameters of the laser crystals, including length, cross-section, doping concentration, etc., the thermal lens effect in the laser crystals is the same by using the pumping light sources with the same coverage and the same pumping power for pumping. By simulating a corresponding relationship between the pumping light of one of the laser crystals and a thermal lens effect in advance, the laser crystals can be pumped in the same pumping mode, which reduces procedures of laser debugging, can ensure that the laser crystals have laser outputs of the same parameters, improves stability of the final laser output, and also ensures optical quality and power of the output laser light.

In some embodiments, the four semiconductor pumping light sources may have different covering angles. When the corresponding laser crystals have different lengths or doping concentrations, the covering angles of the four semiconductor pumping light sources may be set to be different. Generally, a covering angle is directly proportional to a doping concentration and/or a length of a laser crystal. For example, four laser crystals are provided with four pumping light sources, and the pumping light sources cover the corresponding laser crystals in sequence by 120°, 90°, 60° and 90° along the direction of the optical path. By matching a corresponding coverage angle based on the length and/or doping concentration of each laser crystal, the pumping efficiency of the laser crystal can be maximized within the thermal lens effect range, enabling each pair of laser crystal and pumping light source to achieve the best matching state, thereby achieving maximum-power laser output.

In some embodiments, along a direction of the optical path, the four semiconductor pumping light sources have the same length as the corresponding four laser crystals along the direction of the optical path. By matching an equal-length pumping light source based on a length of each laser crystal, the pumping efficiency of the laser crystal can be maximized within the thermal lens effect range, enabling each pair of laser crystal and pumping light source to achieve the best matching state, thereby achieving maximum-power laser output.

In some embodiments, the four discontinuous laser crystals have the same cross-section, thus ensuring that oscillating light generated by the laser crystals is coaxial, and further ensuring the narrow pulse width characteristics of final output laser light.

In some embodiments, the four discontinuous laser crystals have the same or different lengths. In some embodiments, each of the four discontinuous laser crystals has a cross-section of 3 mm*3 mm; and each of the n discontinuous laser crystals has a length of 10-20 mm.

In some embodiments, each of the four discontinuous laser crystals is a Tm-doped laser crystal with a doping concentration directly proportional to the length of the laser crystal.

In some embodiments, by configuring a corresponding number of laser crystals, the average power of the final output of the laser light source can reach 100-500 W. Such high-power output is very difficult in a single crystal structure.

According to the present invention, by controlling the 1.9 μm high-power laser light source and the light spot adjusting device, the size of the light spot and a focal depth at the object to be subjected to fusion welding are changed, so that high-precision cutting or welding can be realized. The high-power 1.9 μm laser output can be achieved by side pumping of a plurality of discontinuous laser crystals, and the thermal effect problem of the laser crystals under high power is solved by a plurality of surrounding semiconductor side pumping light sources, thereby achieving high-power laser output.

Finally, it should be noted that the embodiments of the description are described in a progressive manner, each embodiment focuses on the difference from other embodiments, and for the same and similar parts between the embodiments, reference may be made to each other.

The foregoing embodiments are only used to explain the technical solutions of the present disclosure, and are not intended to limit the same. Although the present disclosure is described in detail with reference to the foregoing embodiments, those of ordinary skill in the art should understand that they can still modify the technical solutions described in the foregoing embodiments, or perform equivalent substitutions on some technical features therein. These modifications or substitutions do not make the essence of the corresponding technical solutions deviate from the spirit and scope of the technical solutions of the embodiments of the present disclosure.

What is claimed is:

1. A laser fusion welding device, comprising a 1.9 μm laser light source, a control unit and a light spot adjusting device, wherein the control unit is configured to control the 1.9 μm laser light source and the light spot adjusting device to adjust a laser power density at an object to be subjected to fusion welding;
    the 1.9 μm laser light source has output power of 100 W-500 W;
    the control unit comprises a time control unit, a power control unit and a light spot control unit, wherein the time control unit is configured to control a turn-on time of the 1.9 μm laser light source, the power control unit is configured to control the output power of the 1.9 μm laser light source, and the light spot control unit is configured to control the light spot adjusting device to adjust a size of a light spot at the object to be subjected to fusion welding; and
    the light spot adjusting device comprises a lens barrel, an electric slideway axially arranged along an inner side wall of the lens barrel, and a plurality of optical lenses arranged in the lens barrel, and the light spot control unit is configured to control a distance between the plurality of optical lenses through the electric slideway to adjust the size of the light spot at the object to be subjected to fusion welding;
    the 1.9 μm laser light source comprises a resonant cavity and n discontinuous laser crystals located in the resonant cavity, wherein the resonant cavity comprises a total reflection mirror and an output mirror, the total reflection mirror is coated with a 1.9 μm high-reflection film layer, the output mirror is coated with a film layer having a transmittance of 10% for 1.9 μm, the n discontinuous laser crystals are all Tm: yttrium aluminum perovskite (YAP), and the n discontinuous laser crystals are in a side pumping mode; and
    side faces of the n discontinuous laser crystals are provided with n semiconductor pumping light sources in a one-to-one relationship, a sum of angles of the n semiconductor pumping light sources surrounding the n discontinuous laser crystals is 360°, and n is a natural number greater than or equal to 4.

2. The laser fusion welding device according to claim 1, wherein the plurality of optical lenses comprise a first lens, a second lens and a third lens, wherein the first lens is configured as a collimating lens and arranged at a light incident end of the lens barrel; and the second lens and the third lens slide along the electric slideway to change the size of the light spot at the object to be subjected to fusion welding.

3. The laser fusion welding device according to claim 1 wherein projections of trajectories of any two of the n semiconductor pumping light sources surrounding laser crystals on a projection plane formed by end faces of the laser crystals along a direction of an optical path do not overlap.

4. The laser fusion welding device according to claim 3, wherein projections of trajectories of the n semiconductor pumping light sources surrounding the laser crystals on the projection plane formed by end faces of the laser crystals along the direction of the optical path form a complete circle.

5. The laser fusion welding device according to claim 4, wherein the trajectories of the n semiconductor pumping light sources surrounding the n laser crystals are sequentially projected on the projection plane formed by the end faces of the laser crystals along the direction of the optical path, and the projections of the trajectories are connected end to end to form the complete circle.

6. The laser fusion welding device according to claim 1, wherein along a direction of an optical path, the n semiconductor pumping light sources have a same length as the corresponding n laser crystals along the direction of the optical path.

7. The laser fusion welding device according to claim 1, wherein the n discontinuous laser crystals have a same cross-section.

8. The laser fusion welding device according to claim 1, wherein the n discontinuous laser crystals have same or different lengths.

9. The laser fusion welding device according to claim 1, wherein each of the n discontinuous laser crystals has a cross-section of 3 mm*3 mm; each of the n discontinuous laser crystals has a length of 10 mm-20 mm; and each of the n discontinuous laser crystals is a Tm-doped laser crystal with a doping concentration directly proportional to the length of the laser crystal.

* * * * *